(12) United States Patent
Ito et al.

(10) Patent No.: US 9,398,239 B2
(45) Date of Patent: Jul. 19, 2016

(54) SOLID-STATE IMAGING DEVICE HAVING AN ENLARGED DYNAMIC RANGE, AND ELECTRONIC SYSTEM

(71) Applicant: Sony Corporation, Tokyo (JP)

(72) Inventors: Yoshiaki Ito, Tokyo (JP); Gen Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 14/079,109

(22) Filed: Nov. 13, 2013

(65) Prior Publication Data

US 2014/0151532 A1 Jun. 5, 2014

(30) Foreign Application Priority Data

Dec. 5, 2012 (JP) ................................. 2012-266001

(51) Int. Cl.
*H01L 27/148* (2006.01)
*H04N 5/3745* (2011.01)
*H04N 5/357* (2011.01)

(52) U.S. Cl.
CPC ......... *H04N 5/37452* (2013.01); *H04N 5/3575* (2013.01)

(58) Field of Classification Search
CPC ... H01L 27/148; H04N 5/3742; H04N 5/3575
USPC ........ 250/208.1, 214 R, 214.1; 257/231, 431, 257/440, 444, 451, 458; 348/294–311
See application file for complete search history.

(56) References Cited

U.S. PATENT DOCUMENTS 6,797,933 B1 * 9/2004 Mendis et al. ............. 250/208.1
2006/0208292 A1 * 9/2006 Itano et al. .................... 257/292

* cited by examiner

*Primary Examiner* — Seung C Sohn
(74) *Attorney, Agent, or Firm* — Chip Law Group

(57) ABSTRACT

A solid-state imaging device includes: a pixel array including a plurality of pixels disposed in a matrix, the pixels including a charge holding section configured to hold a signal charge transferred from a photoelectric conversion section, and to include a capacitor section having a first capacitance value and an additional capacitor section for increasing the first capacitance value to be a second capacitance value; and to part of a reset transistor configured to reset a charge held by the charge holding section, a test-voltage power source configured to apply a test voltage having a voltage different from a drive voltage of the reset transistor.

7 Claims, 18 Drawing Sheets

SOLID-STATE IMAGING DEVICE HAVING AN ENLARGED DYNAMIC RANGE, AND ELECTRONIC SYSTEM

CROSS REFERENCE TO RELATED APPLICATIONS

This application claims the benefit of Japanese Priority Patent Application JP 2012-266001 filed Dec. 5, 2012, the entire contents of which are incorporated herein by reference.

BACKGROUND

The present technique relates to a solid-state imaging device, and an electronic system. In particular, the present technique relates to a solid-state imaging device capable of enlarging a dynamic range without deteriorating an image quality, and an electronic system.

Techniques related to an image sensor having two FD capacitances in a pixel section have been proposed in order to obtain image signals having different dynamic ranges using a signal charge in the same storage period (for example, Japanese Unexamined Patent Application Publication No. 2000-165754 or Japanese Patent No. 4502278).

In such an image sensor, electrons stored in a PD are converted into voltages by the individual FD capacitances to be read.

For example, in the technique in Japanese Patent No. 4502278, a modulated presaturated charge signal $(S_1')$+a modulated supersaturated charge signal $(S_2')$+$C_{FD}$+$C_S$ noise $(N_2)$, and $C_{FD}$+$C_S$ noise $(N_2)$ are input into a differential amplifier DC. The difference between these is calculated to cancel $C_{FD}$+$C_S$ noise $(N_2)$. And further, an adjustment is made to have the same gain as a presaturated charge signal $(S_1)$ by restoration with an amplifier AP using a capacitance ratio of $C_{FD}$ to $C_S$ so that the sum $(S_1+S_2)$ of the presaturated charge signal and the supersaturated charge signal is obtained.

Before the signal $S_1'+S_2'+N_2$ and the signal $N_2$ are input into the differential amplifier DC 2, the signal $S_1'+S_2'+N_2$ and the signal $N_2$ may be digitized by A/D converters ADC that are disposed as necessary. Alternatively, the analog signal may be directly input into the differential amplifier DC without disposing the ADC.

Using such a technique, it is possible to enlarge a dynamic range of an image sensor.

SUMMARY

Incidentally, in the case of generating a pixel signal in an image sensor having two FD capacitances, it is necessary to perform calculation using a ratio (capacitance ratio) of the two FD capacitances. Accordingly, noise may occur on the pixel signal unless a correct capacitance ratio is used.

However, in a manufacturing process of semiconductor chips, fluctuations occur in manufacturing conditions, and thus variations may occur in electrical characteristics of devices. In such a case, even if a capacitance ratio in design is used, it is further difficult to say that the capacitance ratio is correct. Accordingly, problems, for example, deterioration of linearity, and so on are liable to occur in a pixel signal generated by calculation using an incorrect capacitance ratio.

Further, in a manufacturing process of semiconductor chips, in the case where FD capacitance changes in accordance with a position on a wafer surface, and so on, fixed-pattern noise, such as shading, caused by stationary deterioration of linearity occurs, for example.

The present technique has been disclosed in view of these circumstances, and it is desirable to enlarge a dynamic range without deteriorating an image quality.

According to an embodiment of the present technique, there is provided a solid-state imaging device including: a pixel array including a plurality of pixels disposed in a matrix, the pixels including a charge holding section configured to hold a signal charge transferred from a photoelectric conversion section, and to include a capacitor section having a first capacitance value and an additional capacitor section for increasing the first capacitance value to be a second capacitance value; and to part of a reset transistor configured to reset a charge held by the charge holding section, a test-voltage power source configured to apply a test voltage having a voltage different from a drive voltage of the reset transistor.

In a solid-state imaging device according to the above-described embodiment, in each of the plurality of pixels in the pixel array, before a pixel signal corresponding to light received by the photoelectric conversion section is read, the reset transistor may be turned on so that the charge holding section holds a charge corresponding to the test voltage.

In a solid-state imaging device according to the above-described embodiment, in pixels in one predetermined row in the pixel array, before a pixel signal corresponding to light received by the photoelectric conversion section is read, the reset transistor may be turned on so that the charge holding section holds a charge corresponding to the test voltage.

In a solid-state imaging device according to the above-described embodiment, a light receiving section of the pixels in the one predetermined row in the pixel array may be shaded, and before a pixel signal corresponding to light received by the photoelectric conversion section is read, a transfer transistor configured to transfer a signal charge from the photoelectric conversion section to the charge holding section may be turned on together with the reset transistor so that the photoelectric conversion section holds a charge corresponding to the test voltage.

A solid-state imaging device according to the above-described embodiment may further include a calculation section configured to calculate a capacitance ratio being a ratio of the first capacitance value to the second capacitance value on the basis of a high gain signal generated on the basis of a signal voltage corresponding to a charge stored in the charge holding section when capacity of the charge holding section is set to the first capacitance value, and a low gain signal generated on the basis of a signal voltage when capacity of the charge holding section is set to the second capacitance value.

In a solid-state imaging device according to the above-described embodiment, each of the high gain signal and the low gain signal may be a signal from which noise has been removed by correlated double sampling processing.

A solid-state imaging device according to the above-described embodiment may further include a memory configured to store the capacitance ratio.

According to another embodiment of the present technique, there is provided an electronic system including: a solid-state imaging device including a pixel array including a plurality of pixels disposed in a matrix, the pixels including a charge holding section configured to hold a signal charge transferred from a photoelectric conversion section, and to include a capacitor section having a first capacitance value and an additional capacitor section for increasing the first capacitance value to be a second capacitance value; and to part of a reset transistor configured to reset a charge held by the charge holding section, a test-voltage power source configured to apply a test voltage having a voltage different from a drive voltage of the reset transistor.

In a solid-state imaging device according to an embodiment of the present technique, the solid-state imaging device includes a pixel array including a plurality of pixels disposed in a matrix, the pixels including a charge holding section configured to hold a signal charge transferred from a photoelectric conversion section, and to include a capacitor section having a first capacitance value and an additional capacitor section for increasing the first capacitance value to be a second capacitance value. And to part of a reset transistor configured to reset a charge held by the charge holding section, a test-voltage power source is configured to apply a test voltage having a voltage different from a drive voltage of the reset transistor.

By the present technique, it is possible to enlarge a dynamic range without deteriorating an image quality.

BRIEF DESCRIPTION OF THE DRAWINGS

FIG. 3 is a diagram illustrating an equivalent circuit to that in FIG. 1 when TFD is turned on;

DETAILED DESCRIPTION OF EMBODIMENTS

In the following, descriptions will be given of embodiments of the technique to be disclosed with reference to the drawings.

First, a description will be given of problems of a related-art technique.

Figure 1:
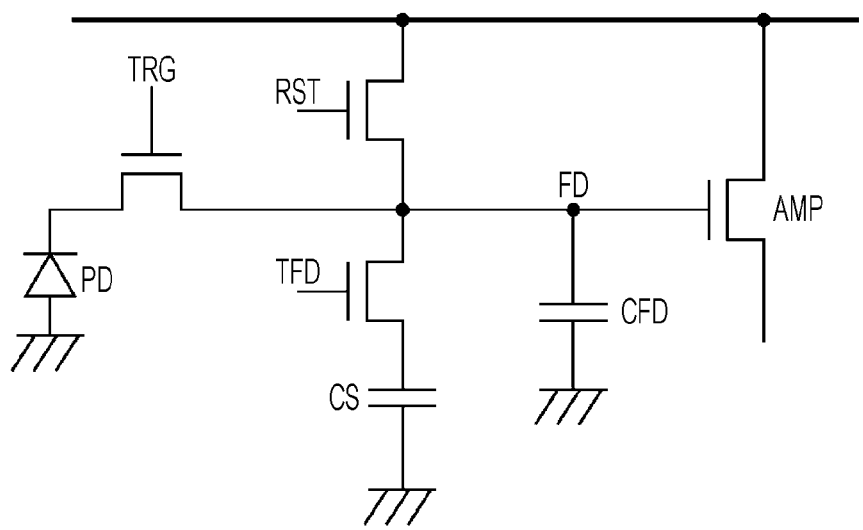
FIG. 1 is a simplified circuit diagram illustrating a configuration of a pixel section of an image sensor having two FD capacitances.

FIG. 1 is a simplified circuit diagram illustrating a configuration of a pixel section of an image sensor having two FD capacitances.

In a pixel section in this example, an electric charge stored in a photodiode (PD) is transferred to a floating diffusion (FD) through a transfer transistor (TRG). Also, after the charge stored in the FD is read, a reset transistor (RST) is turned on so that a voltage of a power source is supplied to the FD, and the potential of the FD is reset.

The charge stored in the FD is read as a signal voltage described later through an amplification transistor (AMP). In this regard, the signal voltage is read by turning on a selection transistor not illustrated in FIG. 1.

Also, the pixel section is provided with a capacitor CFD having a relatively small capacitance, and a capacitor CS having a relatively large capacitance, which become capacitors of the FD capacitance. As described above, the charge transferred from the PD is transferred to the FD, and stored there. At this time, the FD switching transistor (TFD) is turned on or off so that the capacity of the FD changes.

Figure 2:
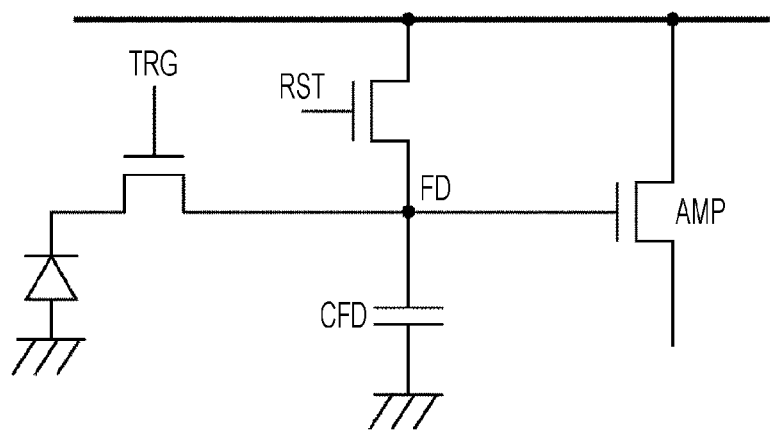
FIG. 2 is a diagram illustrating an equivalent circuit to that in FIG. 1 when TFD is turned off.

When the TFD is turned off, the circuit illustrated in FIG. 1 becomes equivalent to a circuit in FIG. 2. And the charge transferred from the PD is stored in the FD having a capacitance CFD.

Figure 3:
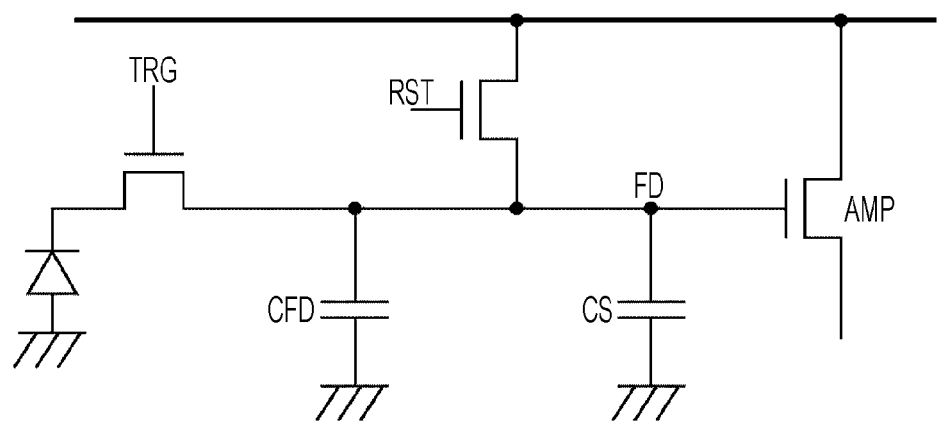

On the other hand, when the TFD is turned on, the circuit illustrated in FIG. 1 becomes equivalent to the circuit in FIG. 3, and the charge transferred from the PD is stored in the FD having a capacitance (CFD+CS).

In the image sensor, a pixel signal output from a pixel section of interest is generated on the basis of a signal voltage corresponding to a charge stored in the FD. If the capacitance of the FD is expressed as C, the signal voltage V read from the FD is expressed as V=Q/C, and thus a signal (referred to as a high gain signal) corresponding to the signal voltage read from the FD in the circuit in FIG. 2 becomes P2=Q/CFD. On the other hand, a signal (referred to as a low gain signal) corresponding to the signal voltage read from the FD in the circuit in FIG. 3 becomes P1=Q/(CFD+CS).

Figure 4:
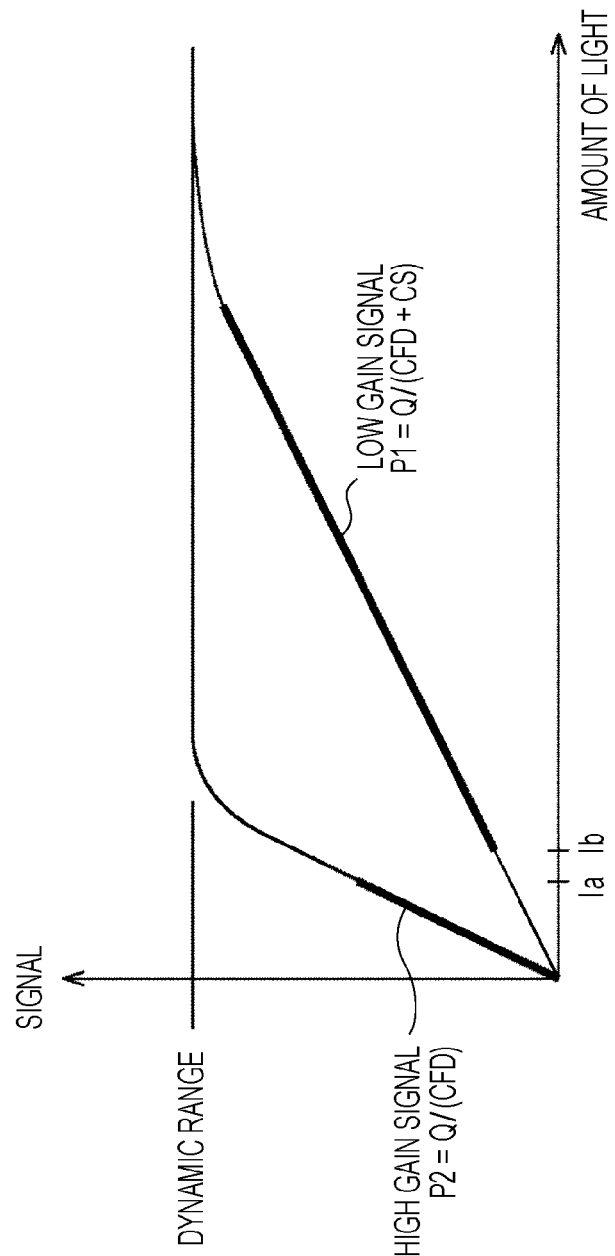
FIG. 4 is an explanatory diagram of a high gain signal P2 and a low gain signal P1.

FIG. 4 is an explanatory diagram of the high gain signal P2 and the low gain signal P1. The horizontal axis in FIG. 4 represents an amount of received light at the PD, and the vertical axis represents a signal level. When the amount of light is sufficiently large, the image sensor generates a pixel signal using the low gain signal P1. When the amount of light is sufficiently small, the image sensor generates a pixel signal using the high gain signal P2. In this manner, it is possible to enlarge the dynamic range of a pixel signal.

On the other hand, when it is difficult to say that the amount of light is sufficiently large, the image sensor generates a pixel signal using a mixed signal of the low gain signal P1 and the high gain signal P2. For example, if the amount of received light at the PD is between the amount of light 1a and the amount of light 1b, a signal (referred to as a composite signal) P1' produced by mixing the low gain signal P1 and the high gain signal P2 is used to generate a pixel signal.

It is possible to obtain the composite signal P1' by calculation using a ratio (capacitance ratio) of the capacitance CFD to the capacitance (CFD+CS) as follows.

$$P1'=P1 \times CFD/(CFD+CS).$$

Figure 5:
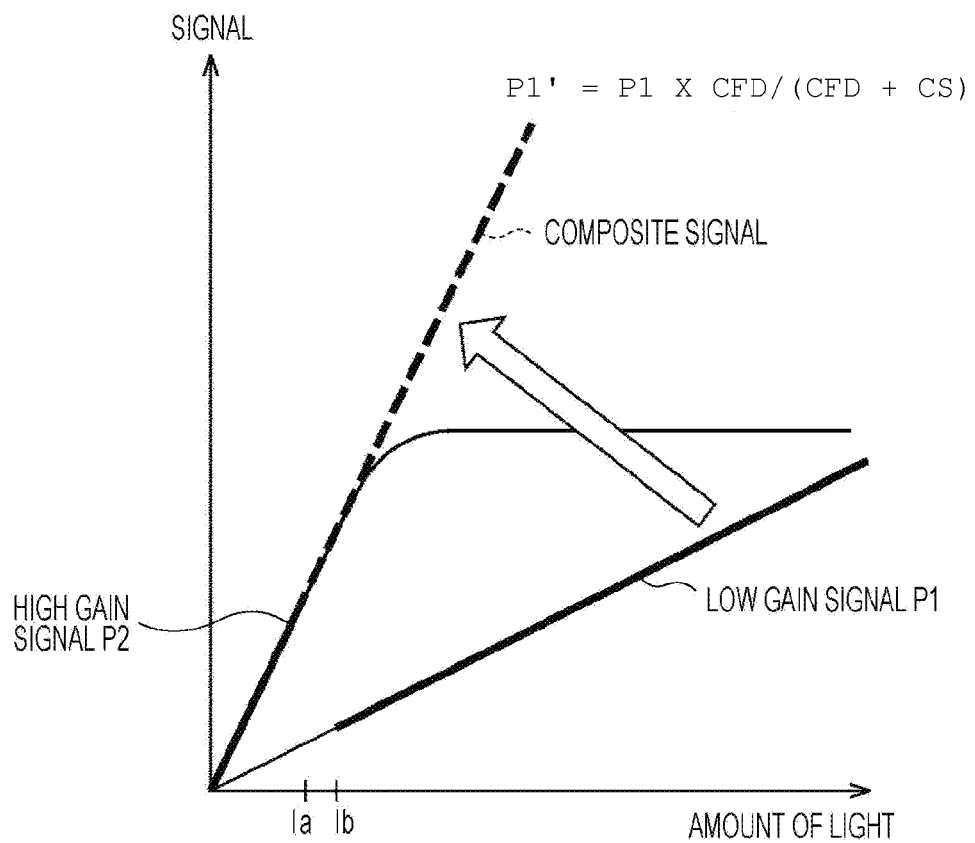
FIG. 5 is an explanatory diagram of a composite signal P1'.

That is to say, as illustrated in FIG. 5, the composite signal P1' is generated by multiplying the low gain signal P1 and a capacitance ratio α (=CFD/(CFD+CS)).

FIG. 5 is an explanatory diagram of the composite signal P1'. The horizontal axis in FIG. 5 represents an amount of received light at the PD, and the vertical axis represents a signal level. In FIG. 5, the composite signal P1' is illustrated as a line having the same slope as that of the high gain signal P2.

Using the composite signal P1' like this, in the case where the amount of received light at the PD is between the amount of light 1a and the amount of light 1b, it becomes possible to generate a pixel signal with the same dynamic range as that in the case where the amount of light is sufficiently small (the case of high gain signal P2).

However, the actual values of the capacitance CFD and the capacitance (CFD+CS) are sometimes different for each pixel section. Fluctuations occur in manufacturing conditions in a manufacturing process of semiconductor chips, and thus variations may occur in electrical characteristics of devices. In this manner, if variations occur in the capacitance CFD and the capacitance (CFD+CS), the capacitance ratio obtained at design time and the actual capacitance ratio sometimes become different with each other.

Figure 6:
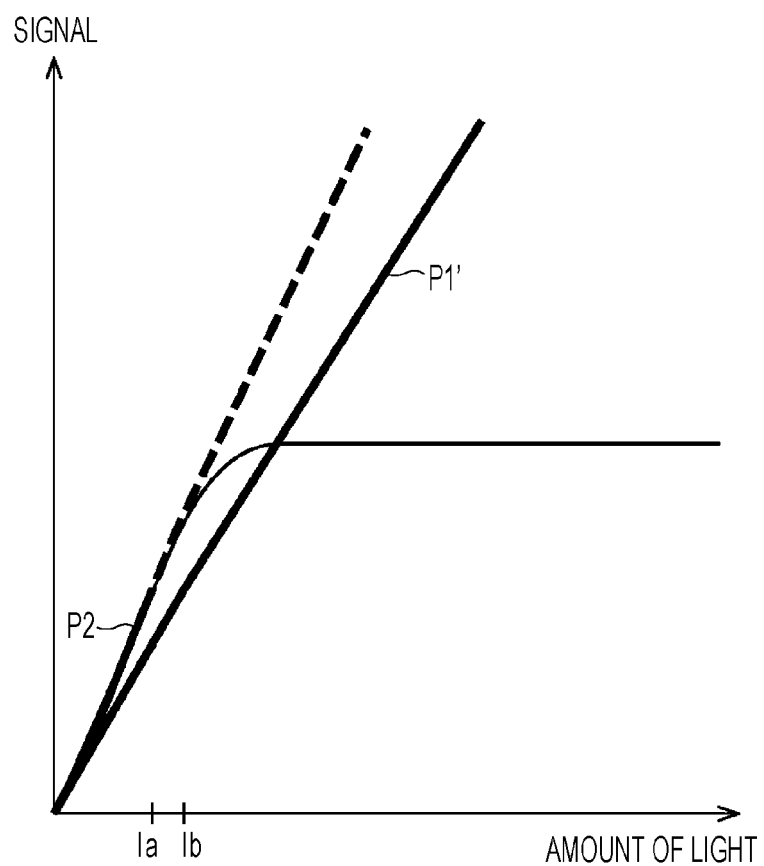
FIG. 6 is an explanatory diagram of a composite signal P1' when variations occur in capacitance CFD and capacitance (CFD+CS)
Figure 7:
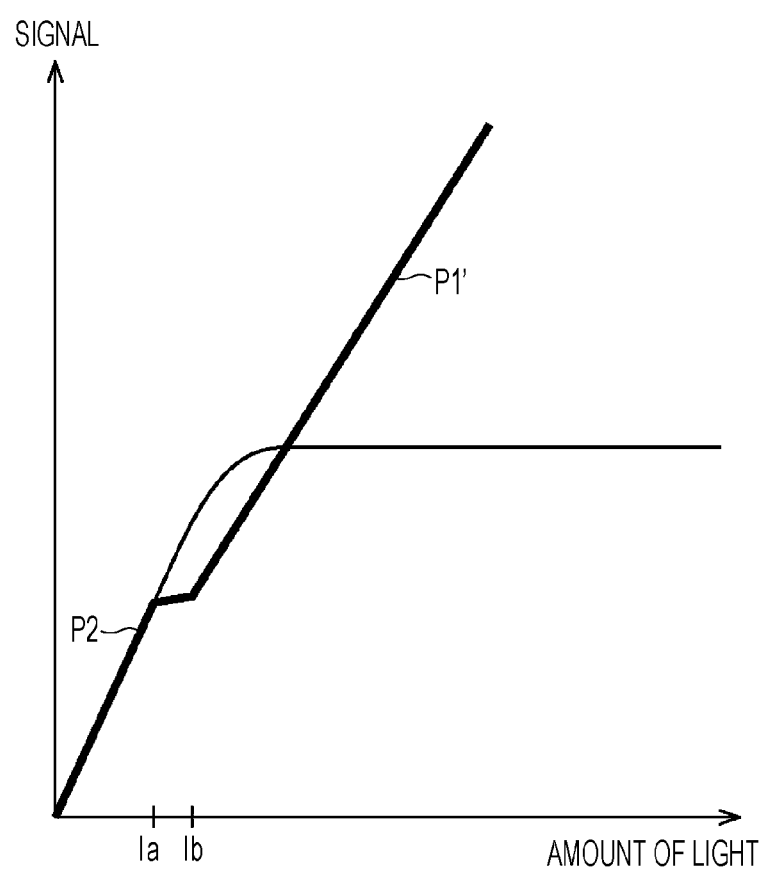
FIG. 7 is an explanatory diagram of a composite signal P1' when variations occur in capacitance CFD and capacitance (CFD+CS)

FIG. 6 and FIG. 7 are explanatory diagrams of a composite signal P1' when variations occur in the capacitance CFD and the capacitance (CFD+CS). The horizontal axis in FIG. 6 and FIG. 7 represents an amount of received light at the PD, and the vertical axis represents a signal level.

As illustrated in FIG. 6, the composite signal P1' originally becomes a line having the same slope as that of the high gain signal P2 (a dotted line in FIG. 6). However, if the capacitance ratio obtained at design time is different from the actual capacitance ratio, the slope of the composite signal P1' becomes different from the slope of the high gain signal P2.

Accordingly, as illustrated in FIG. 7, the linearity between the high gain signal P2 and the composite signal P1' is lost, and thus the signal level of the pixel signal when the amount of received light at the PD is between the amount of light 1a and the amount of light 1b becomes incorrect.

For example, in a manufacturing process of semiconductor chips, when variations occurs in the capacitance CFD and the capacitance (CFD+CS), and so on in accordance with a position on a wafer surface, and so on, for example, fixed-pattern noise, such as shading, which is caused by stationary deterioration of linearity, occurs.

Thus, in the present technique, even if variations occur in the capacity of the FD, the linearity of the pixel signal is made not to be lost.

Figure 8:
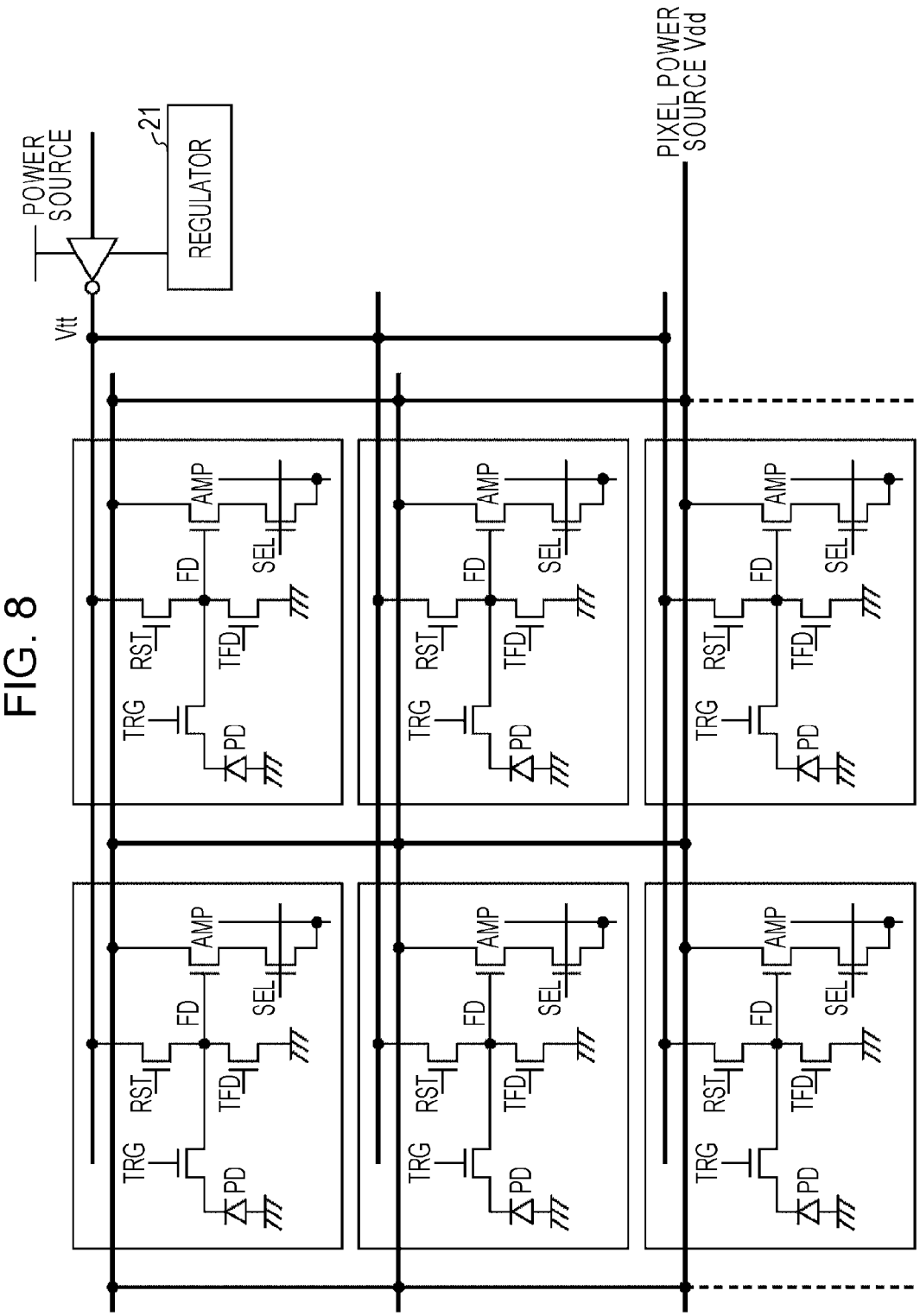
FIG. 8 is a schematic circuit diagram illustrating a configuration of a pixel section of an image sensor to which the present technique is applied.

FIG. 8 is a schematic circuit diagram illustrating a configuration of a pixel section of an image sensor to which the present technique is applied.

In the example in FIG. 8, pixel sections in three rows and in two columns (6 pieces in total) are illustrated. In each of the pixel sections, in the same manner as FIG. 1, a charge stored in the photodiode (PD) is transferred to the floating diffusion (FD) through the transfer transistor TRG.

Also, after the charge stored in the FD is read, the reset transistor (RST) is turned on, and thus a voltage Vdd is supplied to the FD to reset the potential of the FD.

The charge stored in the FD is read as the signal voltage described later through the amplification transistor (AMP). In this regard, the signal voltage is read by turning on a selection transistor not illustrated in FIG. 8.

Also, although illustration is omitted in FIG. 8, in the same manner as the case described above with reference to FIG. 1, each pixel section includes a capacitor to be the FD capacitance, and is provided with a capacitor CFD having a relatively small capacitance and a capacitor CS having a relatively large capacitance. As described above, the charge transferred from the PD is transferred to the FD to be stored. At this time, the FD switching transistor (TFD) is turned on or off to so that the capacitance of the FD is changed.

In the configuration in FIG. 8, unlike the case of FIG. 1, a regulator 21 that applies a voltage Vtt to the drain terminal of the RST is provided.

The voltage Vtt is a voltage different from the voltage Vdd, which is a voltage that controls driving of each transistor in a pixel section, and is a voltage for storing a test charge in the FD as described later. For example, the voltage (drive voltage) Vdd at the time of turning on each transistor is about 3 V, and the voltage (drive stop voltage) Vdd at the time of turning off each transistor is about −0.3 V. On the other hand, the voltage (test voltage) Vtt at the time of storing a test charge into the FD is somewhere between 0 V and 0.3 V, and the voltage Vtt at the time of not storing a test charge into the FD is about 3 V.

That is to say, the image sensor according to the present technique includes the regulator 21 which is a power source that is different from the pixel power source supplying the drive voltage Vdd to each transistor in a pixel section.

When an approximate voltage to ground voltage (for example, the test voltage) is applied to the drain terminal of the RST, a very small amount of charge (referred to as a test charge) is stored in the FD. For example, in the case where the PD receives intense light, when the charge stored in the PD is transferred to the FD, the capacitance CFD fails to store the charge, and the charge overflows. Accordingly, it is necessary to store the charge into the capacitance (CFD+CS). The test charge is a very little charge that is stored without overflowing from the capacitance CFD.

Figure 9:
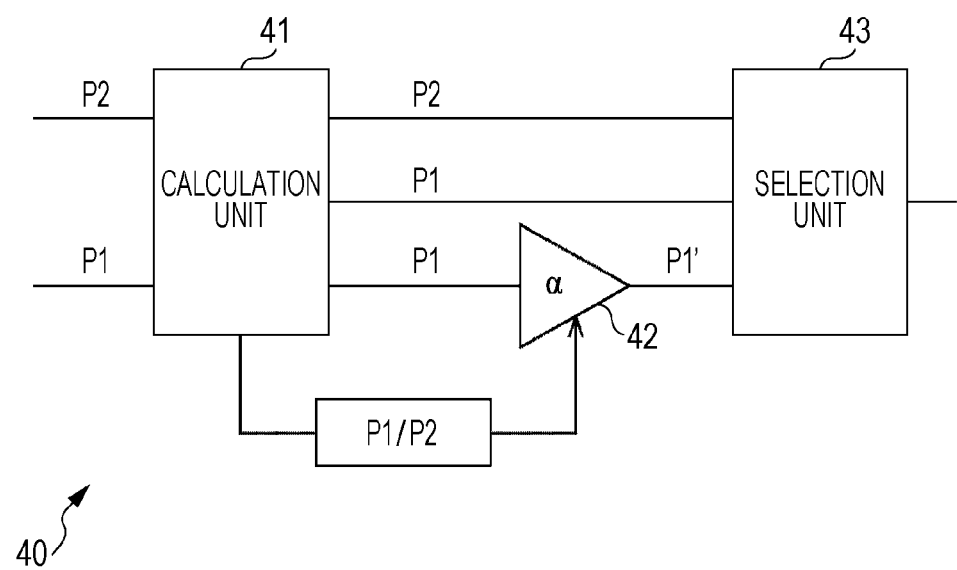
FIG. 9 is a diagram illustrating an example of a configuration of a signal correction circuit disposed in a logic section.

The signal voltage read from the FD of each pixel is supplied to the logic section of the image sensor. FIG. 9 is a diagram illustrating an example of a configuration of a signal correction circuit disposed in the logic section.

In FIG. 9, the high gain signal P2 and the low gain signal P1 are individually input into a calculation unit 41. The calculation unit 41 outputs the high gain signal P2 and the low gain signal P1 directly to a selection unit 43, and calculates the ratio (P1/P2) of the high gain signal to the low gain signal, and outputs a composite signal P1' produced by multiplying the ratio (P1/P2) and the low gain signal P1 to the selection unit 43.

In this regard, as described above, P2=Q/CFD and P1=Q/(CFD+CS), and thus the ratio (P1/P2) becomes the same as the capacitance ratio α. The capacitance ratio α calculated by the calculation unit 41 is held in the buffer 42. In this manner, even if the capacitance ratio α differs for each pixel, it is possible to obtain a proper composite signal P1 all the time. Thereby, it becomes possible to generate a pixel signal without losing the linearity.

The selection unit 43 selects any one of the high gain signal P2, the low gain signal P1, or the composite signal P1, and outputs the signal to a subsequent stage.

An image sensor to which the present technique is applied turns on the RST of all the pixels before reading the pixel signals, for example, to apply the test voltage to the drain terminal of the RST to store the test charge in the FD. After that, a pixel of a predetermined one row is selected to read a signal voltage from the FD, and the capacitance ratio α is calculated and held as described above.

And when a charge received by the PD of a pixel in the row of interest is transferred and read, the composite signal P1' calculated using the capacitance ratio α is read as necessary.

Further, a pixel in the next row is selected, and the signal voltage is read from the FD. As described above, the capacitance ratio α is calculated and held. When the charge received by the PD of the pixel in the row of interest is transferred to the FD to be read, the composite signal P1' calculated using the capacitance ratio α is read as necessary.

In this manner, a pixel signal of a pixel in each row is read. In this manner, even if variations occur in the capacitance of the FD, the linearity of the pixel signal will not be lost.

Also, in an image sensor to which the present technique is applied, correlated double sampling (CDS) processing, which removes a reset component from a signal component, is performed to generate a pixel signal. In the CDS processing, a P-phase period during which a reset component is read from the FD of each pixel, and a D-phase period during which a signal component is read are alternately disposed.

That is to say, in the column ADC circuit, a value of a reset component counted as a P-phase period is removed from a value of the signal component counted as a D-phase period. In this regard, in the P-phase period, and the D-phase period, for example, a comparison is made and a magnitude relation is obtained between a reference signal voltage that changes in sequence in accordance with the clock, and a signal voltage read from the FD, and the clock number is counted until the magnitude relation is reversed in order to generate a digital signal value. That is to say, counting up is carried out in either one of the P-phase period and the D-phase period, and counting down is carried out in the other one. As a result, a digital signal value representing the difference between the signal component and the reset component is obtained.

As described above, the pixel section of an image sensor to which the present technique is applied has two different FD capacitances, and thus the CDS processing is performed two times. That is to say, the CDS processing is provided with a P-phase first period during which a reset component is read when the FD has a capacitance (CFD+CS), a D-phase first period during which a signal component is read when the FD has a capacitance (CFD+CS), a P-phase second period during which a reset component is read when the FD has a capacitance CFD, and a D-phase second period during which a signal component is read when the FD has a capacitance CFD.

Figure 10A:
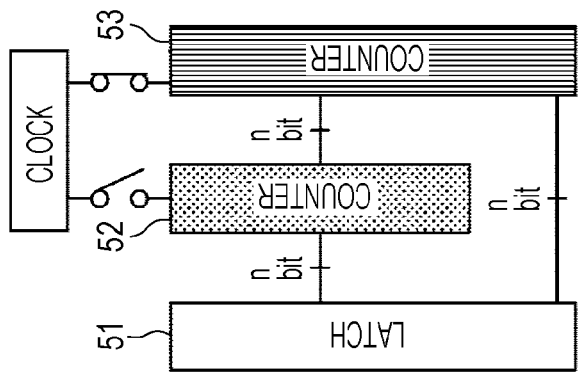
FIGS. 10A, 10B, and 10C are block diagrams illustrating a schematic configuration of a column ADC circuit in an image sensor to which the present technique is applied.
Figure 10B:
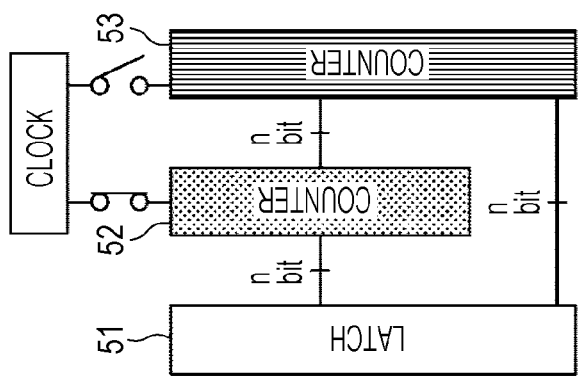
Figure 10C:
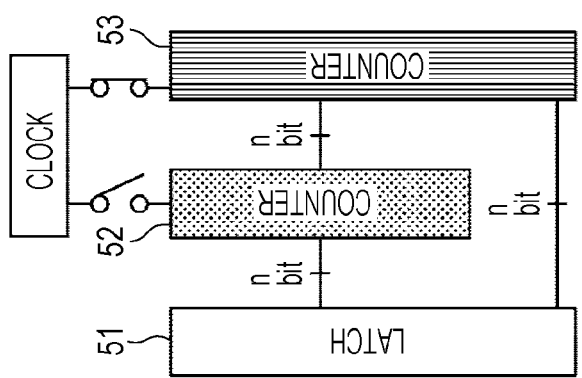

FIGS. 10A, 10B, and 10C are block diagrams illustrating a schematic configuration of a column ADC circuit in an image sensor to which the present technique is applied.

First, as illustrated in FIG. 10A, in the P-phase first period (P-phase1), a clock is supplied to a counter 53 in order to count down the counter 53.

Next, as illustrated in FIG. 10B, in the P-phase second period (P-phase2), a clock is supplied to a counter 52 in order to count down the counter 52, and in the D-phase second period (D-phase2), a clock is supplied to the counter 52 in order to count up the counter 52. Thereby, the counter 52 generates a value (CDS2) of the digital signal representing the difference between the signal component and the reset component. The CDS2 value is held by a latch 51.

After that, as illustrated in FIG. 10C, in the D-phase first period (D-phase1), a clock is supplied to the counter 53 in order to count up the counter 53. Thereby, the counter 53 generates a value (CDS1) of the digital signal representing the difference between the signal component and the reset component. The CDS1 value is held by the latch 51.

Figure 11:
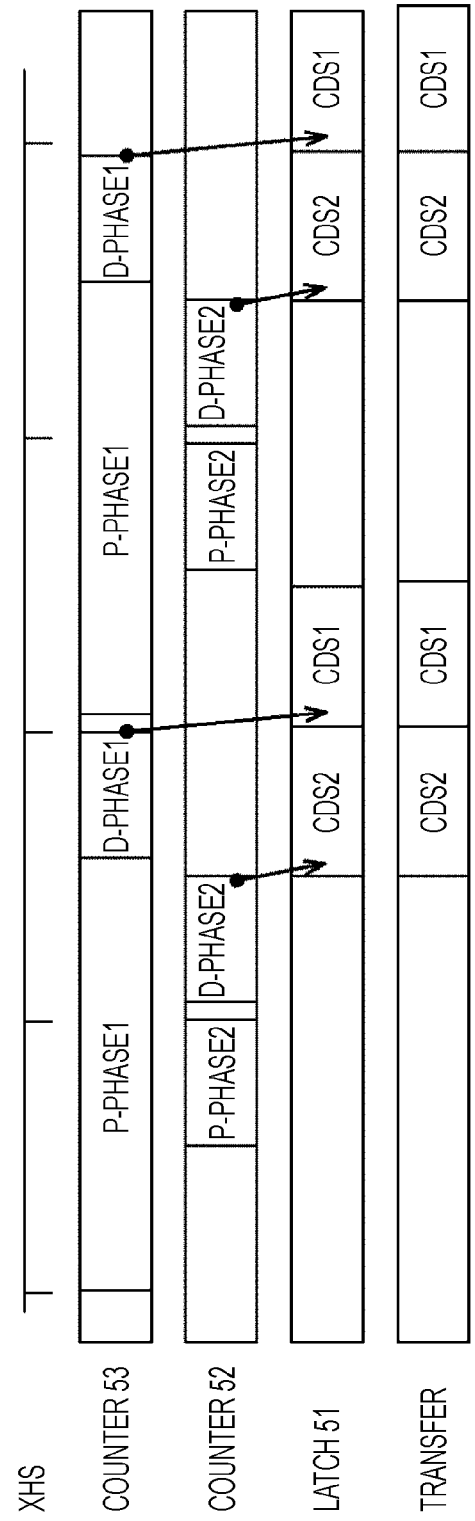
FIG. 11 is a timing chart for explaining general CDS processing in the column ADC circuit illustrated in FIGS. 10A, 10B, and 10C.

FIG. 11 is a timing chart for explaining general CDS processing in the column ADC circuit illustrated in FIG. 10. The uppermost row in FIG. 11, XHS, represents the horizontal synchronization signal. While two pulses of the horizontal synchronization signal are formed (that is to say, in two horizontal transfer periods), the above-described processing is executed with reference to FIG. 10A to FIG. 10C.

On the other hand, in the case of an image sensor to which the present technique is applied, as described above, for example, before a pixel signal is read, a test voltage is applied to the RST of all the pixels, and a test charge is stored in the FD. After that, a pixel is selected for each row, a signal voltage is read from the FD, and the capacitance ratio α is calculated to be held as described above.

Figure 12:
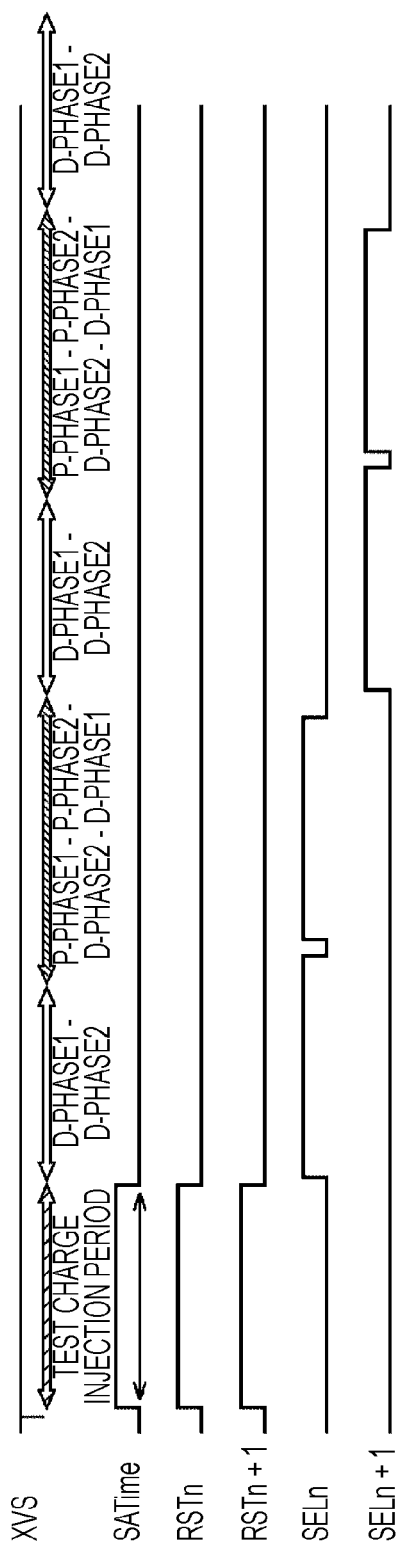
FIG. 12 is a timing chart illustrating forms of individual voltage pulses in an image sensor to which the present technique is applied.

FIG. 12 is a timing chart illustrating forms of individual voltage pulses in an image sensor to which the present technique is applied. In FIG. 12, SATime is a pulse formed while the regulator 21 applies a test voltage. Also, RSTn is a pulse of the drive voltage applied to a reset transistor of the n-th row pixels, and RSTn+1 is a pulse of the drive voltage applied to a reset transistor of the n-th row pixels. Further, SELn is a pulse of the drive voltage applied to a selection transistor in the n-th row, and SELn+1 is a pulse of the drive voltage applied to a selection transistor in the (n+1)-th row.

As illustrated in FIG. 12, in the test charge injection period, the regulator 21 applies the test voltage, and turns on the reset transistor of the n-th row pixels, and the reset transistor of the (n+1)-th row. Thereby, the test charge is stored into the FD of the pixels of the n-th row and the (n+1)-th row. Here, only individual voltage pulses related to the n-th row and the (n+1)-th row are illustrated. However, in reality, in the test charge injection period, the regulator 21 applies the test voltage, and turns on the reset transistor of the pixels in all rows, and the test charge is stored in the FD of the pixels of all the rows.

After that, in the D-phase first period and the D-phase second period, the selection transistors of the n-th row pixels are turned on. At this time, the signal voltage to be read is not a signal voltage corresponding to the charge in accordance with the amount of received light at the PD, but a signal voltage corresponding to the test charge. Thereby, the high gain signal P2 and the low gain signal P1 that are corresponding to the test charge are output. The calculation unit 41 of the column ADC circuit calculates the capacitance ratio α of each pixel of the n-th row, and holds the capacitance ratio α in the buffer 42. In this regard, here, the output high gain signal P2 and low gain signal P1 are not subjected to the CDS processing.

And in the P-phase first period, the P-phase second period, the D-phase first period, and the D-phase second period, the selection transistor of each pixel in the n-th row pixels is turned on. Thereby, a pixel signal corresponding to the charge in accordance with the amount of received light at the PD of each pixel in the n-th row is generated after having been subjected to the CDS processing.

Further, after that, in the D-phase first period, and the D-phase second period, the selection transistor of each pixel in the (n+1)-th row is turned on. Thereby, the calculation unit 41 of the column ADC circuit calculates the capacitance ratio α of each pixel in the (n+1)-th row, and the capacitance ratio α is held in the buffer 42.

And in the P-phase first period, the P-phase second period, the D-phase first period, and the D-phase second period, the selection transistor of each pixel in the (n+1)-th row is turned on. Thereby, a pixel signal corresponding to the charge in accordance with the amount of received light at the PD of each pixel in the (n+1)-th row is generated after having been subjected to the CDS processing.

In this manner, the pixel signal of each pixel in each row is generated.

Figure 13:
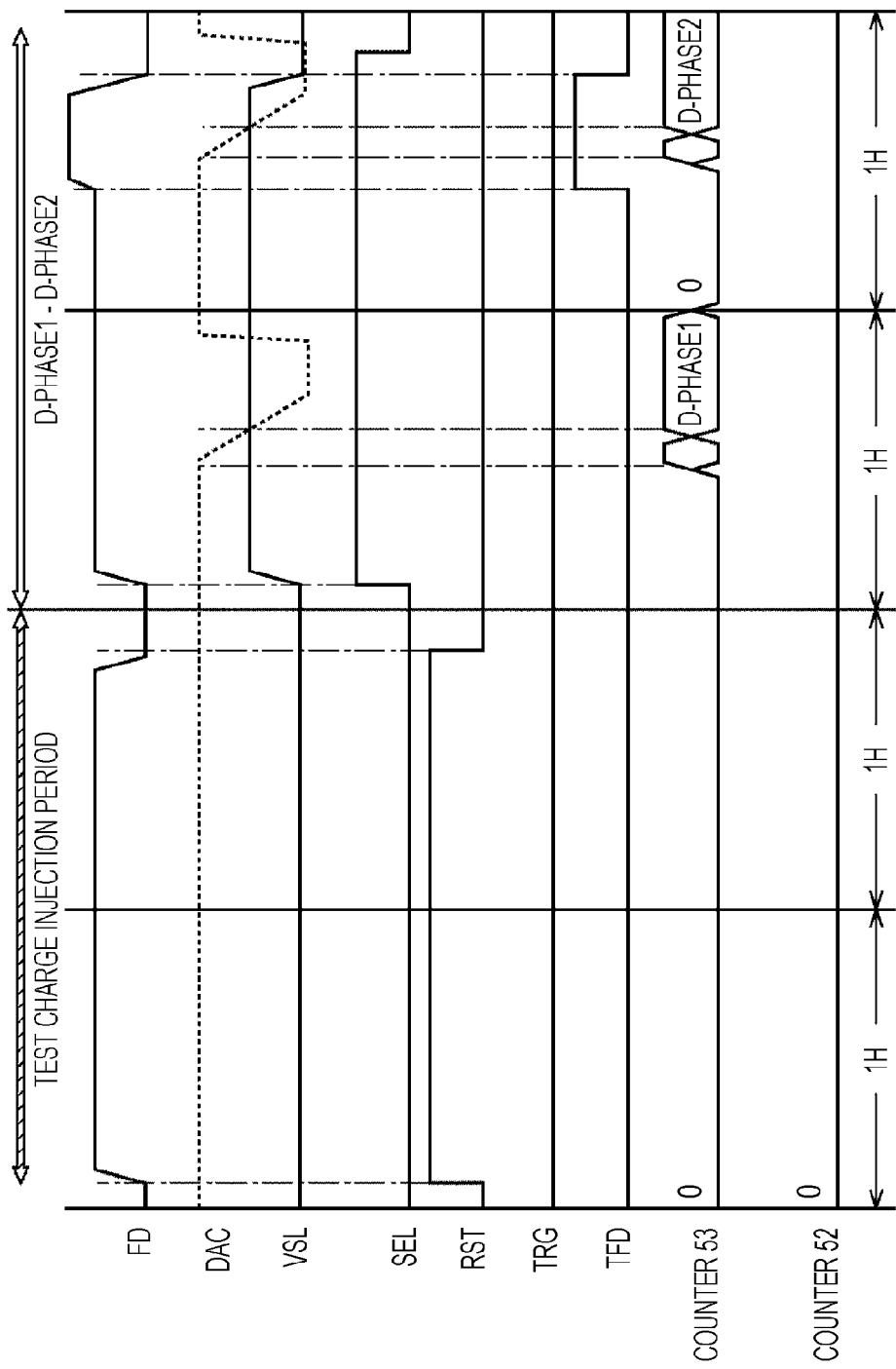
FIG. 13 is a detailed timing chart in a test charge injection period, and a D-phase first period and D-phase second period in FIG. 12.

FIG. 13 is a detailed timing chart in the test charge injection period, the D-phase first period, and the D-phase second period in FIG. 12. In FIG. 13, the horizontal axis represents time, and each signal waveform in four horizontal transfer periods (4H) is illustrated.

FIG. 13 illustrates a change in voltage (FD) corresponding to the charge stored in the FD, a waveform (DAC) of the reference signal voltage generated by the column ADC circuit, and a waveform (VSL) of the signal voltage output from the amplification transistor. Also, FIG. 13 illustrates a waveform (SEL) of the drive voltage of the selection transistor, a waveform (RST) of the drive voltage of the reset transistor, a waveform (TRG) of the drive voltage of the transfer transistor, and a waveform (TFD) of the drive voltage of the FD switching transistor.

Further, in FIG. 13, individual values held in the counter 53, and the counter 52 described above with reference to FIG. 10 are illustrated. In this regard, in FIG. 13, the P-phase first period, the P-phase second period, the D-phase first period, and the D-phase second period are not described, and thus the counter 52 is kept as 0.

As illustrated in FIG. 10, in the charge injection period, RST becomes "H", and the regulator 21 applies a test voltage to store (inject) a test charge into the FD.

Figure 14:
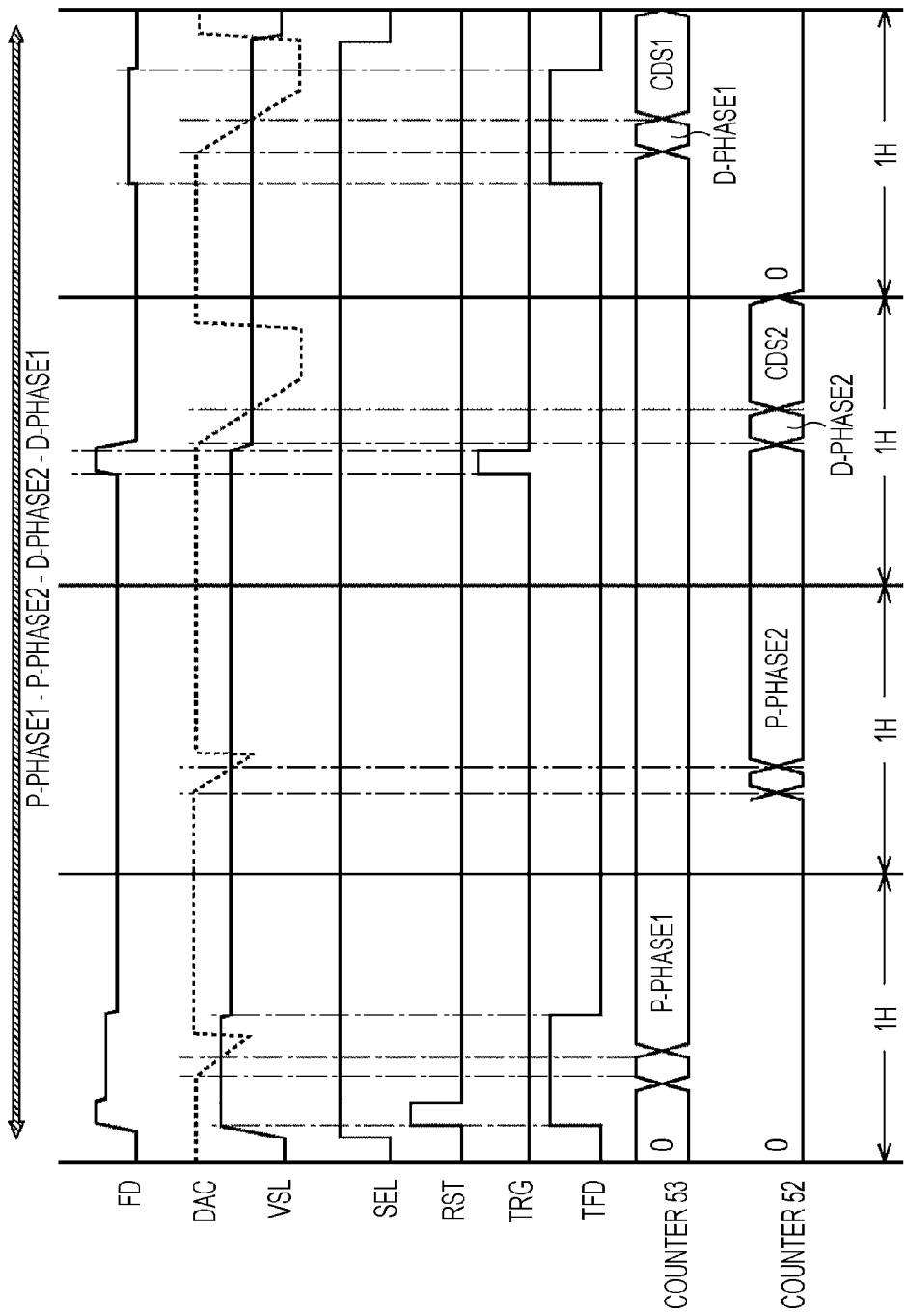
FIG. 14 is a detailed timing chart in a P-phase first period, a P-phase second period, a D-phase first period, and a D-phase second period in FIG. 12.

FIG. 14 is a detailed timing chart in the P-phase first period, the P-phase second period, the D-phase first period, and the D-phase second period in FIG. 12. In FIG. 14, the horizontal axis represents time, and each signal waveform in four horizontal transfer periods (4H) is illustrated.

FIG. 14 also illustrates a change in voltage (FD) corresponding to the charge stored in the FD, a waveform (DAC) of the reference signal voltage generated by the column ADC circuit, and a waveform (VSL) of the signal voltage output from the amplification transistor. Also, FIG. 14 illustrates a waveform (SEL) of the drive voltage of the selection transistor, a waveform (RST) of the drive voltage of the reset transistor, a waveform (TRG) of the drive voltage of the transfer transistor, and a waveform (TFD) of the drive voltage of the FD switching transistor.

Further, in FIG. 14, individual values held in the counter 53, and the counter 52 described above with reference to FIG. 10 are illustrated. In this regard, in FIG. 14, the values of the counter 53 and the counter 52 change as described above with reference to FIG. 10.

That is to say, as described in FIG. 14, in the P-phase first period, the P-phase second period, the D-phase first period, and the D-phase second period, general signal read processing (involves the CDS processing) in an image sensor having two FD capacitances is executed.

In the above, a description has been given that a test voltage is applied to the RST of all the pixels to store a test charge in the FD before reading a pixel signal. However, it is not necessary to store (inject) a test charge into all the pixels at the same time. For example, a test charge may be injected into each pixel in each one row.

Figure 15:
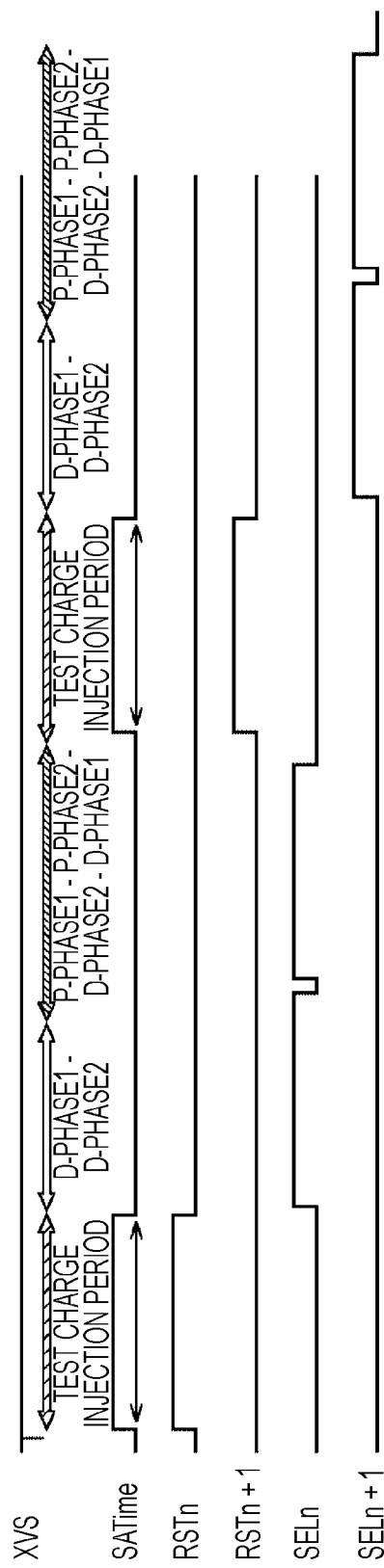
FIG. 15 is a timing chart of the case where a test charge is injected to each pixel for each one row in an image sensor to which the present technique is applied.

FIG. 15 is a timing chart illustrating each voltage pulse form in an image sensor to which the present technique is applied, and is a timing chart of the case where a test charge is injected to each pixel in each one row.

FIG. 15 is a diagram corresponding to FIG. 12. In FIG. 15, SATime is a pulse formed while the regulator 21 applies a test voltage. Also, RSTn is a pulse of the drive voltage applied to a reset transistor of the n-th row pixels, and RSTn+1 is a pulse of the drive voltage applied to a reset transistor of the (n+1)-th row pixels. Further, SELn is a pulse of the drive voltage applied to a selection transistor in the n-th row, and SELn+1 is a pulse of the drive voltage applied to a selection transistor in the (n+1)-th row.

In FIG. 15, in the test charge injection period, the regulator 21 applies the test voltage, and turns on the reset transistor of the n-th row pixels. Thereby, the test charge is stored into the FD of the pixels of the n-th row. In the case of FIG. 15, unlike FIG. 12, in the test charge injection period, a reset transistor of each pixel in the (n+1)-th row is not turned on. Accordingly, in the test charge injection period, a test charge is injected into only each pixel in this one row (the n-th row).

After that, in the D-phase first period and the D-phase second period, the selection transistors of the n-th row pixels are turned on. At this time, the signal voltage to be read is not a signal voltage corresponding to the charge in accordance with the amount of received light at the PD, but a signal voltage corresponding to the test charge. Thereby, the high gain signal P2 and the low gain signal P1 that are corresponding to the test charge are output. The calculation unit 41 of the column ADC circuit calculates the capacitance ratio α of each pixel of the n-th row, and holds the capacitance ratio α in the buffer 42. In this regard, here, the output high gain signal P2 and low gain signal P1 are not subjected to the CDS processing.

And in the P-phase first period, the P-phase second period, the D-phase first period, and the D-phase second period, the selection transistor of each pixel in the n-th row pixels is turned on. Thereby, a pixel signal corresponding to the charge in accordance with the amount of received light at the PD of each pixel in the n-th row is generated after having been subjected to the CDS processing.

After that, in the next test charge injection period, the regulator 21 applies the test voltage, and turns on the reset transistor of each pixel in the (n+1)-th row. Thereby, the test charge is stored in the FD of each pixel in the (n+1)-th row. In the test charge injection period, the reset transistor of the n-th row pixels is not turned on, and thus the test charge is injected into only the pixels in this one row (the (n+1)-th row).

Further, after that, in the D-phase first period, and the D-phase second period, the selection transistor of each pixel in the (n+1)-th row is turned on. Thereby, the calculation unit 41 of the column ADC circuit calculates the capacitance ratio α of each pixel in the (n+1)-th row, and the capacitance ratio α is held in the buffer 42.

And in the P-phase first period, the P-phase second period, the D-phase first period, and the D-phase second period, the selection transistor of each pixel in the (n+1)-th row is turned on. Thereby, a pixel signal corresponding to the charge in accordance with the amount of received light at the PD of each pixel in the (n+1)-th row is generated after having been subjected to the CDS processing.

In this manner, a pixel signal of each pixel in each row is generated.

For example, in the case where the test charge is injected into pixels in all the rows at the same time, a pixel in a row having a late order in reading takes a long time from injection of the test charge to reading, and thus a charge flows from the FD so that the test charge might become difficult to be maintained. When the test charge is injected into each pixel in each one row, it is possible to shorten necessary time from injection of the test charge to reading in each pixel in all the rows, and thus it becomes possible to reliably maintain the test charge.

In the above, a description has been given of the embodiment in which the test charge is injected into the pixels in all the rows. However, in this way, it is necessary to inject the test charge and calculate the capacitance ratio α in all the rows, and thus it becomes difficult to increase the frame rate. Accordingly, for example, one row to be a representative (a representative row) may be determined in the pixel array, and the test charge may be injected into only the representative row. And a capacitance ratio α for each pixel in each column in the representative row is obtained, and the obtained α may be applied to the pixels corresponding to the column in all the other rows.

In this manner, it becomes easy to increase the frame rate.

Further, when the test charge is injected into only a representative row, the light receiving section of the pixels in only the representative row may be shaded, and used only for calculating the capacitance ratio α without performing photoelecric conversion on the pixels in the representative row. In this manner, it is possible to perform CDS processing at the time of calculating the capacitance ratio α.

For example, in the circuit illustrated in FIG. 8, in the test charge injection period, the transfer transistor (TRG) is also turned on together with the reset transistor (RST). In this manner, the test voltage is also applied to the PD. As a result, the test charge is also stored in the PD.

After that, the charge of the FD is reset, and by providing the P-phase first period, the P-phase second period, the D-phase first period, and the D-phase second period, it is possible to obtain the high gain signal P2 and the low gain signal P1, which have been subjected to the CDS processing. Thereby, it becomes possible to calculate a capacitance ratio α on the basis of a ratio of the high gain signal P2 to the low gain signal P1, from which the reset component has been removed.

Figure 16:
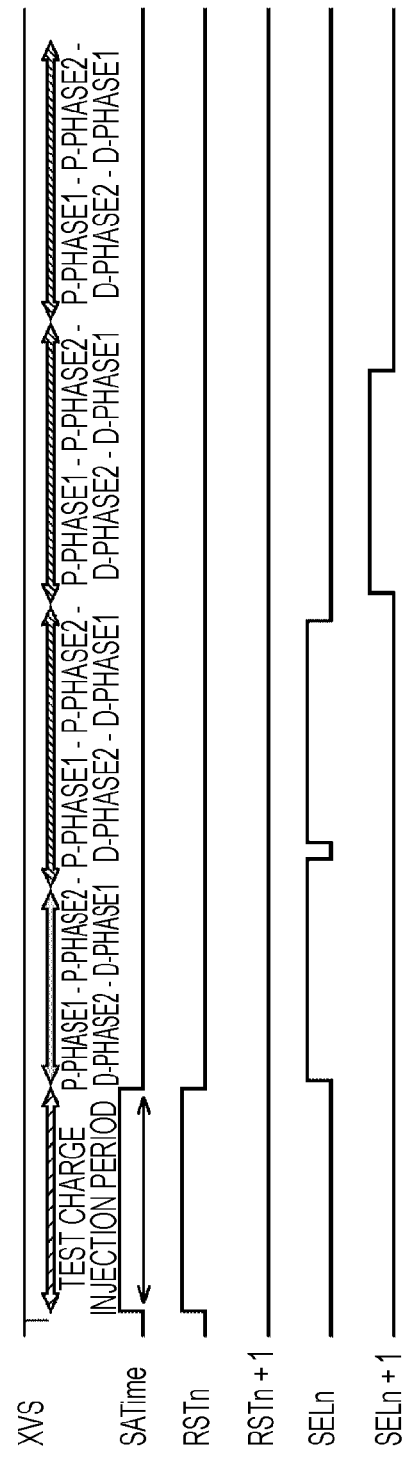
FIG. 16 is a timing chart of the case where a test charge is injected to only a representative row in an image sensor to which the present technique is applied.

FIG. 16 is a timing chart illustrating each voltage pulse form in an image sensor to which the present technique is applied, and is a timing chart of the case where a test charge is injected to only a representative row in the image sensor to which the present technique is applied.

FIG. 16 is a diagram corresponding to FIG. 12. In FIG. 15, SATime is a pulse formed while the regulator 21 applies a test voltage. Also, RSTn is a pulse of the drive voltage applied to a reset transistor of the n-th row pixels, and RSTn+1 is a pulse of the drive voltage applied to a reset transistor of the (n+1)-th row pixels. Further, SELn is a pulse of the drive voltage applied to a selection transistor in the n-th row, and SELn+1 is a pulse of the drive voltage applied to a selection transistor in the (n+1)-th row.

In FIG. 16, the n-th row is the representative row.

In FIG. 16, in the test charge injection period, the regulator 21 applies the test voltage, and turns on the reset transistor of the n-th row pixels. Thereby, the test charge is stored into the FD of the pixels of the n-th row. In the case of FIG. 16, unlike FIG. 12, in the test charge injection period, a reset transistor of each pixel in the (n+1)-th row is not turned on. Accordingly, in the test charge injection period, a test charge is injected into only each pixel in this one row (the n-th row).

After that, in the P-phase first period, the P-phase second period, the D-phase first period, and the D-phase second period, the selection transistors of the n-th row pixels are turned on. At this time, the signal voltage to be read is a signal voltage corresponding to the charge of the FD immediately after reset, and a signal voltage at the time when the test charge stored in the PD is transferred to the FD. Thereby, the high gain signal P2 and the low gain signal P1 that have been subjected to the CDS processing are output, and the calculation unit 41 of the column ADC circuit calculates the capacitance ratio α of each pixel in the n-th row, and holds the capacitance ratio α in the buffer 42.

And in the P-phase first period, the P-phase second period, the D-phase first period, and the D-phase second period, the selection transistor of each pixel in the n-th row pixels is turned on. Thereby, a pixel signal corresponding to the charge in accordance with the amount of received light at the PD of each pixel in the n-th row is generated after having been subjected to the CDS processing.

After that, in the P-phase first period, the P-phase second period, the D-phase first period, and the D-phase second period, the selection transistor of each pixel in the (n+1)-th row is turned on. Thereby, a pixel signal corresponding to the charge received at the PD of each pixel in the (n+1)-th row is generated after going through the CDS processing.

In the next P-phase first period, P-phase second period, D-phase first period, and D-phase second period, a pixel signal corresponding to the charge received at the PD of each pixel in the (n+2)-th row is generated after going through the CDS processing.

In this manner, the pixel signal of each pixel in each row is generated.

In this manner, it becomes possible to perform the CDS processing on the high gain signal P2 and the low gain signal P1 that are used for calculating the capacitance ratio α, and thus it is possible to generate the composite signal P1' using a more correct capacitance ratio α.

Figure 17:
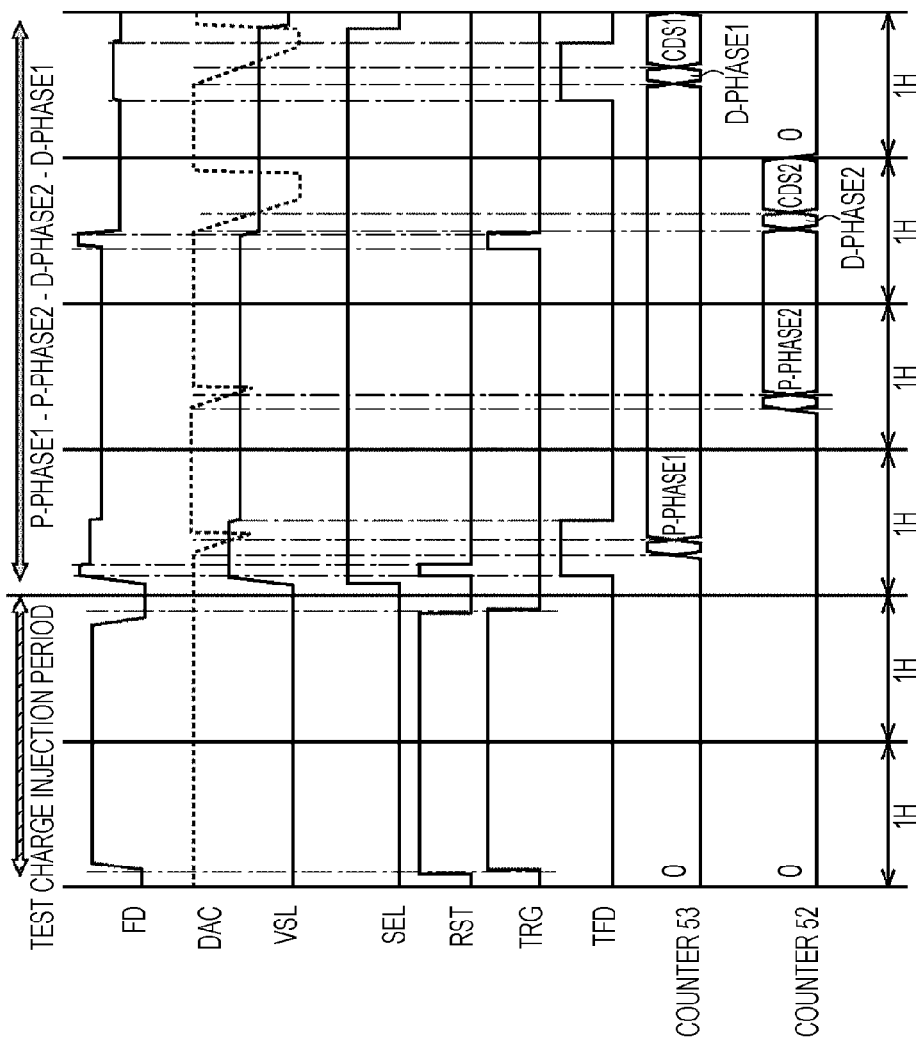
FIG. 17 is a detailed timing chart in the test charge injection period, and the P-phase first period, the P-phase second period, the D-phase first period, and the D-phase second period in FIG. 16.

FIG. 17 is a detailed timing chart in the test charge injection period, and the P-phase first period, the P-phase second period, the D-phase first period, and the D-phase second period in FIG. 16. In FIG. 17, the horizontal axis represents time, and each signal waveform in six horizontal transfer periods (6H) is illustrated. In this regard, the P-phase first period, the P-phase second period, the D-phase first period, and the D-phase second period that are illustrated in FIG. 17 are the periods located on the right of the test charge injection period (the first P-phase first period, the P-phase second period, the D-phase first period, and the D-phase second period) in FIG. 16, and the periods related to the reading of a signal voltage corresponding to the test charge and the CDS processing.

FIG. 17 illustrates a change in voltage (FD) corresponding to the charge stored in the FD, a waveform (DAC) of the reference signal voltage generated by the column ADC circuit, and a waveform (VSL) of the signal voltage output from the amplification transistor. Also, FIG. 17 illustrates a waveform (SEL) of the drive voltage of the selection transistor, a waveform (RST) of the drive voltage of the reset transistor, a waveform (TRG) of the drive voltage of the transfer transistor, and a waveform (TFD) of the drive voltage of the FD switching transistor.

Further, in FIG. 17, individual values held in the counter 53, and the counter 52 described above with reference to FIG. 10 are illustrated.

As illustrated in FIG. 17, in the charge injection period, RST becomes "H", and TRG becomes "H". At this time, the regulator 21 applies the test voltage, and the test charge is stored (injected) into the PD and the FD.

After that, in the P-phase first period, the P-phase second period, the D-phase first period, and the D-phase second period, RST and TRG individually become "L", but RST becomes "H" again. Thereby, the FD is reset. After that, in the P-phase first period and the P-phase second period, the reset component is held in the counter 53 and the counter 52.

And TRG becomes "H", and the test charge stored in the PD is transferred to the FD. After that, in the D-phase first period and the D-phase second period, the signal component is held in the counter 53 and the counter 52, and the CDS processing is performed.

The detailed timing chart in the P-phase first period, the P-phase second period, the D-phase first period, and the D-phase second period for the second round in FIG. 16 is the same as that in FIG. 14. General signal read processing (involves the CDS processing) in an image sensor having two FD capacitances is executed.

Figure 18:
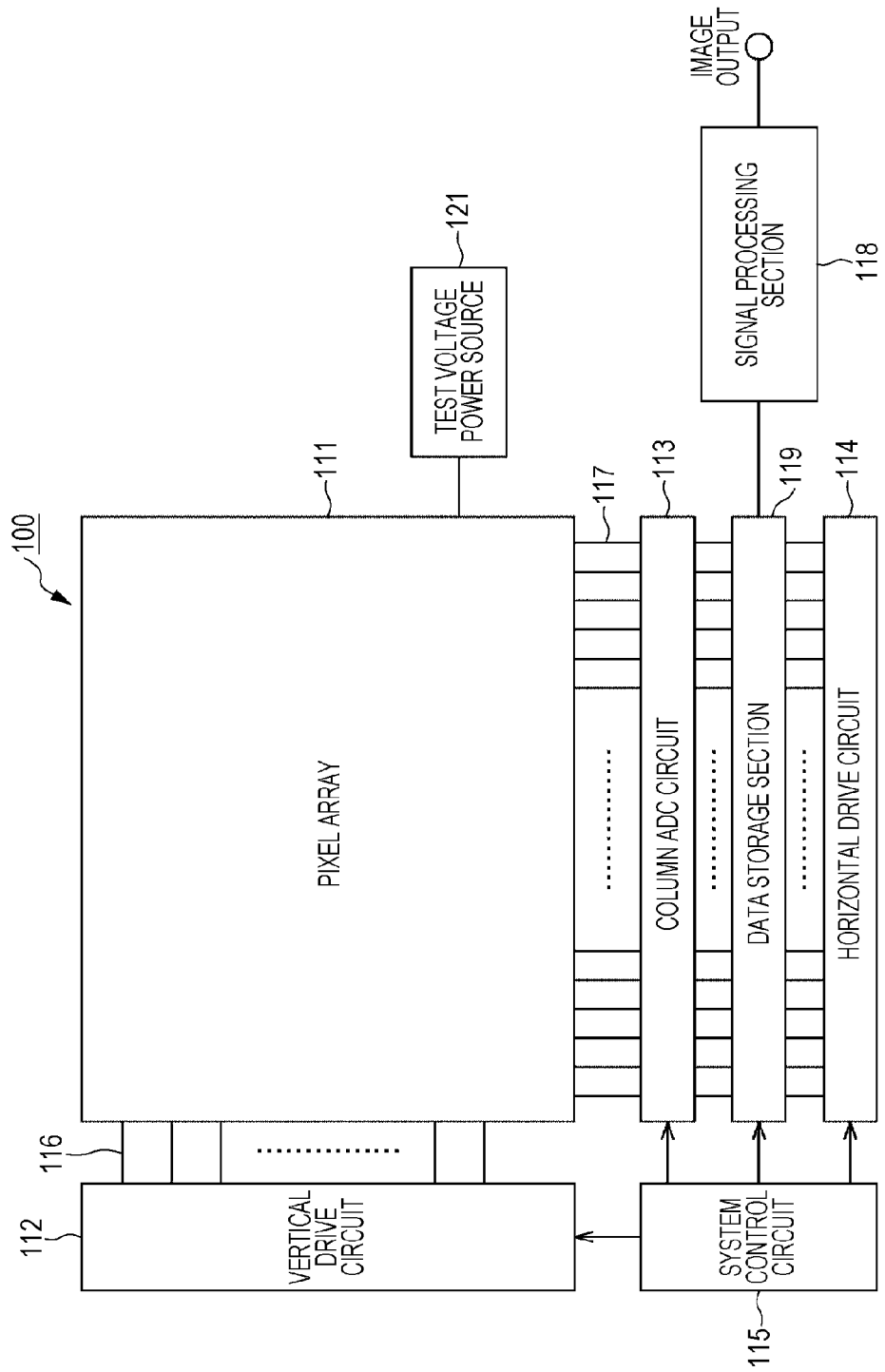
FIG. 18 is a system configuration diagram schematically illustrating a solid-state imaging device to which the present technique is applied.

FIG. 18 is a system configuration diagram schematically illustrating a solid-state imaging device to which the present technique is applied. Here, a schematic system configuration diagram of a CMOS image sensor 100 to which the present technique is applied is illustrated.

As illustrated in FIG. 18, the CMOS image sensor 100 has a configuration including a pixel array 111 formed on a semiconductor substrate (chip) not illustrated in FIG. 18, and a peripheral circuit section integrated on the same semiconductor substrate as the pixel array 111. In this example, the peripheral circuit section includes a vertical drive circuit 112, a column ADC circuit 113, a horizontal drive circuit 114, and a system control section 115.

The CMOS image sensor 100 further includes a signal processing section 118, and a data storage section 119. The signal processing section 118, and the data storage section 119 may be substituted by processing performed by an external signal processing section disposed on a different substrate as that of the image sensor 100, for example, by a DSP (Digital Signal Processor), and software. Also, the signal processing section 118, and the data storage section 119 may be mounted on the same substrate as that of the image sensor 100.

In the pixel array 111, pixels including a photoelecric conversion element (for example, a photodiode: PD) are disposed in a two-dimensional matrix. That is to say, the pixel array 111 includes a large number of the pixels having a configuration described above with reference to FIG. 8.

In the pixel array 111, further, a pixel drive line 116 is formed along the horizontal direction in FIG. 18 (pixel arrangement direction in a pixel row) for each row of the matrix-state pixel array, and a vertical signal line 117 is formed along the vertical direction in FIG. 18 (pixel arrangement direction in a pixel column) for each column. In FIG. 18, the pixel drive line 116 is illustrated as one line. However, the number of lines is not limited to one. Each one end of the pixel drive line 116 is connected to an output end of a corresponding row of the vertical drive circuit 112.

Also, a test voltage power source 121 is connected to the pixel array 111. The test voltage power source is a power source for applying a voltage near ground voltage to the drain terminal of the reset transistor of each pixel disposed in the pixel array 111 as a test voltage. For example, the regulator 21 in FIG. 8 constitutes the test voltage power source.

The vertical drive circuit 112 includes a shift register, an address decoder, and so on. The vertical drive circuit 112 is a pixel drive circuit that drives each pixel of the pixel array 111 at the same time with all the pixels, or for each row, and the like.

A signal output from each unit pixel in the pixel row having been subjected to selection scanning by the vertical drive circuit 112 is supplied to the column ADC circuit 113 through each of the vertical signal lines 117. The column ADC circuit 113 performs predetermined signal processing on a signal output from each unit pixel in a selected row through the vertical signal line 117 for each pixel column of the pixel array 111, and temporarily holds a pixel signal after the signal processing.

Specifically, the column ADC circuit 113 performs at least the above-described CDS processing as the signal processing.

The column ADC circuit 113 is provided with the counter and the latch as described above with reference to FIG. 10.

The horizontal drive circuit 114 includes a shift register, an address decoder, and the like, and selects a unit circuit corresponding to a pixel column of the column ADC circuit 113. By selection scanning by the horizontal drive circuit 114, a pixel signal having been subjected to the signal processing by the column ADC circuit 113 is output in sequence.

The system control section 115 includes a timing generator for generating various timing signals, and the like, and performs drive control on the vertical drive circuit 112, the column ADC circuit 113, and the horizontal drive circuit 114, and the like on the basis of various timing signals generated by the timing generator.

The signal processing section 118 includes at least an addition processing function, and performs various kinds of signal processing, such as addition processing, and so on, on the pixel signal output from the column ADC circuit 113. The signal processing section 118 is provided with a logic section, and the logic section is provided with a signal correction circuit described above with reference to FIG. 9.

When the signal processing section 118 performs signal processing, the data storage section 119 temporarily stores necessary data for the processing.

Incidentally, in the above-described embodiment, before a signal voltage corresponding to the charge in accordance with the amount of light received by the PD is read, the capacitance ratio α is calculated for each time the signal voltage is read. However, for example at the time of starting an image sensor, and so on, the capacitance ratio α may be calculated only once, and the capacitance ratio for each pixel may be stored in a memory, and so on.

And after the capacitance ratios α are stored for all the pixels, a time period in which the selection transistor in each row is on may be the P-phase first period, the P-phase second period, the D-phase first period, and the D-phase second period. That is to say, after the capacitance ratios α for all the pixels are obtained, pixel signals may be read in the same manner as a general image sensor.

In the case where the capacitance ratio α is calculated only once, and the capacitance ratio for each pixel is stored in a memory, and so on, the capacitance ratio α of each pixel in each row may be calculated and stored as described above with reference to FIG. 12 or FIG. 15. Alternatively, the capacitance ratio α of only each pixel in a representative row may be calculated and stored as described above with reference to FIG. 16.

In this manner, it is possible not to lose the linearity of the pixel signal. And at the time of actually capturing an image, only general signal reading processing (involves the CDS processing) in an image sensor including two FD capacitances ought to be executed.

On the other hand, as described above, in the case where the capacitance ratio α is calculated only once, it is necessary to dispose a large number of memories for storing the capacitance ratios α, and this will result in an increase in cost. Thus, for example, the capacitance ratios α of all the pixels may be calculated before shipment, and the average value of those ratios ought to be obtained. And the difference value between the average value of the capacitance ratios α and the capacitance ratio in design ought to be calculated, and the difference value ought to be stored in the memory.

In this case, for example, the logic section in the signal processing section 118 may be provided with a non-rewritable memory which is capable of maintaining memory contents without supplying power, and the above-described the difference value ought to be stored in this memory. And at the time of generating the composite signal P1, the capacitance ratio α ought to be obtained using the capacitance ratio in design and the above-described difference value, and the composite signal P1 ought to be generated by that capacitance ratio α. However, the capacitance ratio α in this case becomes the average value of the capacitance ratios of all the pixels, and thus the precision decreases slightly compared with the case of obtaining the capacitance ratio α for each pixel.

In this manner, it is possible to reduce cost concerning the memory. Also, as a matter of course, it is possible to maintain the linearity of the pixel signal, and at the time of actually capturing an image, only general signal reading processing (involves the CDS processing) in an image sensor including two FD capacitances ought to be executed.

Figure 19:
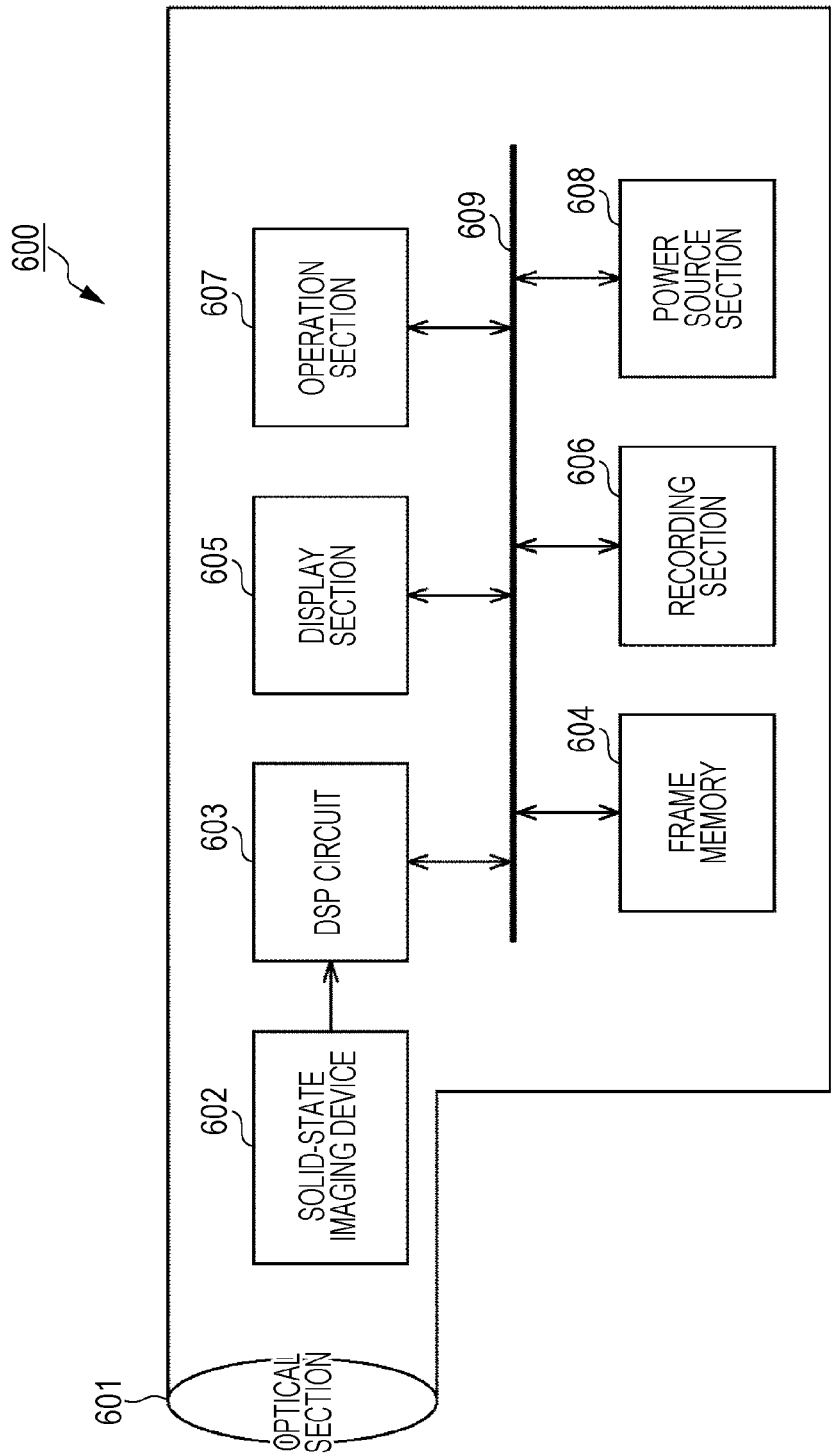
FIG. 19 is a block diagram illustrating an example of a configuration of an imaging apparatus as an electronic system to which the present technique is applied.

FIG. 19 is a block diagram illustrating an example of a configuration of an imaging apparatus as an electronic system to which the present technique is applied.

An imaging apparatus 600 in FIG. 19 includes an optical section 601 including a lens group, and the like, a solid-state imaging device (imaging device) 602 to which each configuration of the above-described pixel is employed, and a DSP circuit 603, which is a camera signal processing circuit. Also, the imaging apparatus 600 includes a frame memory 604, a display section 605, a recording section 606, an operation section 607, and a power source section 608. The DSP circuit 603, the frame memory 604, the display section 605, the recording section 606, the operation section 607, and the power source section 608 are mutually connected through a bus line 609.

The optical section 601 captures incident light (image light) from a subject, and forms an image on an imaging surface of the solid-state imaging device 602. The solid-state imaging device 602 converts the amount of the incident light formed on the imaging surface by the optical section 601 for each pixel into an electronic signal, and outputs the electronic signal as a pixel signal. For the solid-state imaging device 602, it is possible to use a solid-state imaging device, such as a CMOS image sensor 100 according to the above-described embodiment.

The display section 605 includes a panel-type display device, such as a liquid crystal display device, an organic EL (electro-luminescence) display device, and the like, and displays a moving image or a still image captured by the solid-state imaging device 602. The recording section 606 records the moving image or the still image captured by the solid-state imaging device 602 on a recording medium, such as a video tape, a DVD (Digital Versatile Disk), and so on.

The operation system 607 issues an operation command on various functions held by the imaging apparatus 600 by operation of a user. The power source system 608 suitably supplies various kinds of power sources to be operation power sources to the DSP circuit 603, the frame memory 604, the display section 605, the recording section 606, and the operation section 607.

Also, in the above-described embodiment, the description has been given of the case where the present technique is applied to a CMOS image sensor in which unit pixels 130 that detect signal charges in accordance with the amount of visible light as physical quantities are disposed in a matrix as an example. However, the present technique is not limited to be applied to a CMOS image sensor. It is possible to generally apply the present technique to a solid-state imaging device of a column type, in which a column processing section is disposed for each pixel column of a pixel array section.

Also, the present disclosure is not limited to be applied to a solid-state imaging device that detects distribution of an amount of visible incident light in order to capture an image. It is possible to apply the present disclosure to a solid-state imaging device that captures distribution of an amount of incidence, such as infrared rays, or X-rays, or particles, or the like. The present disclosure can also be applied to, in a broad sense, a solid-state imaging device (physical-quantity distribution detection apparatus) in general, such as a fingerprint detection sensor, which detects distribution of the other physical quantities, for example, pressure, electrostatic capacitance, etc., to capture an image.

In this regard, in the present specification, the above-described series of processing includes, of course, the processing performed in time series in accordance with the described sequence, but also includes the processing that is not necessarily performed in time series, namely, the processing performed in parallel or individually.

Also, an embodiment of the present technique is not limited to the above-described embodiments, and various changes are possible without departing from the spirit and scope of the present technique.

In this regard, it is possible to configure the present technique as follows.

(1) A solid-state imaging device including:
a pixel array including a plurality of pixels disposed in a matrix, the pixels including a charge holding section configured to hold a signal charge transferred from a photoelectric conversion section, and to include a capacitor section having a first capacitance value and an additional capacitor section for increasing the first capacitance value to be a second capacitance value; and
to part of a reset transistor configured to reset a charge held by the charge holding section, a test-voltage power source configured to apply a test voltage having a voltage different from a drive voltage of the reset transistor.

(2) The solid-state imaging device according to (1),
wherein in each of the plurality of pixels in the pixel array,
before a pixel signal corresponding to light received by the photoelectric conversion section is read, the reset transistor is turned on so that the charge holding section holds a charge corresponding to the test voltage.

(3) The solid-state imaging device according to (1) or (2),
wherein in pixels in one predetermined row in the pixel array,
before a pixel signal corresponding to light received by the photoelectric conversion section is read, the reset transistor is turned on so that the charge holding section holds a charge corresponding to the test voltage.

(4) The solid-state imaging device according to (3),
wherein a light receiving section of the pixels in the one predetermined row in the pixel array is shaded, and
before a pixel signal corresponding to light received by the photoelectric conversion section is read, a transfer transistor configured to transfer a signal charge from the photoelectric conversion section to the charge holding section is turned on together with the reset transistor so that the photoelectric conversion section holds a charge corresponding to the test voltage.

(5) The solid-state imaging device according to any one of (1) to (4), further including a calculation section configured to calculate a capacitance ratio being a ratio of the first capacitance value to the second capacitance value on the basis of a high gain signal generated on the basis of a signal voltage corresponding to a charge stored in the charge holding section when capacity of the charge holding section is set to the first capacitance value, and a low gain signal generated on the basis of a signal voltage when capacity of the charge holding section is set to the second capacitance value.

(6) The solid-state imaging device according to (5),
wherein each of the high gain signal and the low gain signal is a signal from which noise has been removed by correlated double sampling processing.

(7) The solid-state imaging device according to (5) or (6), further including a memory configured to store the capacitance ratio.

(8) An electronic system including:
a solid-state imaging device including
a pixel array including a plurality of pixels disposed in a matrix,
the pixels including a charge holding section configured to hold a signal charge transferred from a photoelectric conversion section, and including a capacitor section having a first capacitance value and an additional capacitor section for increasing the first capacitance value to be a second capacitance value; and
to part of a reset transistor configured to reset a charge held by the charge holding section, a test-voltage power source configured to apply a test voltage having a voltage different from a drive voltage of the reset transistor.

What is claimed is:

1. A solid-state imaging device comprising:
a pixel array including a plurality of pixels disposed in a matrix, the plurality of pixels including a charge holding section configured to hold a signal charge transferred from a photoelectric conversion section, and a capacitor section having a first capacitance value and an additional capacitor section for increasing the first capacitance value to be a second capacitance value;
a reset transistor configured to reset a charge held by the charge holding section;
a test-voltage power source configured to apply a test voltage having a voltage different from a drive voltage of the reset transistor; and
a calculation section configured to calculate a capacitance ratio being a ratio of the first capacitance value to the second capacitance value on the basis of a high gain signal generated on the basis of a signal voltage corresponding to a charge stored in the charge holding section in an event capacity of the charge holding section is set to the first capacitance value, and a low gain signal generated on the basis of a signal voltage in an event capacity of the charge holding section is set to the second capacitance value.

2. The solid-state imaging device according to claim 1,
wherein in each of the plurality of pixels in the pixel array,
before a pixel signal corresponding to light received by the photoelectric conversion section is read, the reset transistor is turned on so that the charge holding section holds a charge corresponding to the test voltage.

3. The solid-state imaging device according to claim 1,
wherein in pixels in one predetermined row in the pixel array,
before a pixel signal corresponding to light received by the photoelectric conversion section is read, the reset transistor is turned on so that the charge holding section holds a charge corresponding to the test voltage.

4. The solid-state imaging device according to claim 3,
wherein a light receiving section of the pixels in the one predetermined row in the pixel array is shaded, and
before the pixel signal corresponding to the light received by the photoelectric conversion section is read, a transfer transistor configured to transfer a signal charge from the photoelectric conversion section to the charge holding section is turned on together with the reset transistor so that the photoelectric conversion section holds a charge corresponding to the test voltage.

5. The solid-state imaging device according to claim 1,
wherein each of the high gain signal and the low gain signal is a signal from which noise has been removed by correlated double sampling processing.

6. The solid-state imaging device according to claim 1, further comprising a memory configured to store the capacitance ratio.

7. An electronic system comprising:
a solid-state imaging device including
a pixel array including a plurality of pixels disposed in a matrix, the plurality of pixels including a charge holding section configured to hold a signal charge transferred from a photoelectric conversion section, and a capacitor section having a first capacitance value and an additional capacitor section for increasing the first capacitance value to be a second capacitance value;
a reset transistor configured to reset a charge held by the charge holding section;
a test-voltage power source configured to apply a test voltage having a voltage different from a drive voltage of the reset transistor; and
a calculation section configured to calculate a capacitance ratio being a ratio of the first capacitance value to the second capacitance value on the basis of a high gain signal generated on the basis of a signal voltage corresponding to a charge stored in the charge holding section in an event capacity of the charge holding section is set to the first capacitance value, and a low gain signal generated on the basis of a signal voltage in an event capacity of the charge holding section is set to the second capacitance value.

* * * * *